United States Patent
Machida et al.

(10) Patent No.: US 8,423,020 B2
(45) Date of Patent: Apr. 16, 2013

(54) COMMUNICATION METHOD, MOBILE STATION APPARATUS AND WIRELESS BASE STATION APPARATUS

(75) Inventors: Mamoru Machida, Kawasaki (JP); Hirokazu Murakami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 374 days.

(21) Appl. No.: 11/527,541

(22) Filed: Sep. 27, 2006

(65) Prior Publication Data

US 2007/0265002 A1 Nov. 15, 2007

(30) Foreign Application Priority Data

May 10, 2006 (JP) ................................. 2006-131177

(51) Int. Cl.
*H04W 4/00* (2009.01)
(52) U.S. Cl.
USPC ........ 455/435.1; 455/450; 455/509; 370/331; 370/328; 370/338
(58) Field of Classification Search .......... 455/450–453, 455/509–517, 455, 461, 432.1, 574, 434–439, 455/440, 441, 456.1–458, 63.1, 78, 414.2, 455/404.2, 405, 464; 370/328–333, 316, 370/335, 338, 445, 447, 448, 459, 461, 462, 370/438
See application file for complete search history.

(56) References Cited

U.S. PATENT DOCUMENTS

| | | | | |
|---|---|---|---|---|
| 2001/0024427 | A1* | 9/2001 | Suzuki | 370/329 |
| 2002/0065082 | A1* | 5/2002 | Yegani et al. | 455/452 |
| 2002/0145565 | A1* | 10/2002 | Rabinowitz et al. | 342/464 |
| 2002/0147019 | A1* | 10/2002 | Uhlik et al. | 455/452 |
| 2002/0183039 | A1* | 12/2002 | Padgett et al. | 455/406 |
| 2002/0191554 | A1* | 12/2002 | Kondo | 370/328 |
| 2003/0078065 | A1* | 4/2003 | Hoagland et al. | 455/517 |
| 2003/0193906 | A1* | 10/2003 | Andrews et al. | 370/329 |
| 2004/0014491 | A1* | 1/2004 | Weigand | 455/552.1 |
| 2004/0066757 | A1* | 4/2004 | Molteni et al. | 370/329 |
| 2004/0092271 | A1* | 5/2004 | Viikari et al. | 455/456.2 |
| 2004/0095902 | A1* | 5/2004 | Laroia et al. | 370/328 |
| 2004/0095904 | A1* | 5/2004 | Laroia et al. | 370/329 |
| 2004/0102165 | A1* | 5/2004 | Bloebaum et al. | 455/141 |

(Continued)

FOREIGN PATENT DOCUMENTS

| | | |
|---|---|---|
| EP | 1211907 | 6/2002 |
| JP | 11-27231 | 1/1999 |
| JP | 2001-103032 | 4/2001 |
| JP | 2005-198215 | 7/2001 |

OTHER PUBLICATIONS

European Search Report based on EP 06254971 (dated Jan. 16, 2009).

*Primary Examiner* — Chuong A Ngo
(74) *Attorney, Agent, or Firm* — Smith, Gambrell & Russell, LLP

(57) ABSTRACT

In a communication method, a wireless base station apparatus periodically sends a reference signal to a mobile station apparatus; the mobile station apparatus selects resources to be used for sending communication data to the wireless base station apparatus based on a receive time when receiving the reference signal first; the mobile station apparatus sends information on selected resources to the wireless base station apparatus, and sends communication data to the wireless base station apparatus using the selected resources; the wireless base station apparatus receives and demodulates the communication data based on the information on the resources sent from the mobile station apparatus.

13 Claims, 16 Drawing Sheets

U.S. PATENT DOCUMENTS

| | | | |
|---|---|---|---|
| 2004/0146020 A1* | 7/2004 | Kubler et al. | 370/329 |
| 2004/0185889 A1* | 9/2004 | Shipman | 455/517 |
| 2004/0203968 A1* | 10/2004 | Gopalakrishnan et al. | 455/512 |
| 2005/0047429 A1 | 3/2005 | Koo | |
| 2005/0164708 A1* | 7/2005 | Gabriel et al. | 455/452.2 |
| 2005/0270975 A1 | 12/2005 | Meylan | |
| 2005/0286408 A1* | 12/2005 | Jin et al. | 370/208 |
| 2005/0288033 A1* | 12/2005 | McNew et al. | 455/456.1 |
| 2006/0068821 A1* | 3/2006 | Rinne | 455/515 |
| 2006/0209767 A1* | 9/2006 | Chae et al. | 370/335 |
| 2007/0241956 A1* | 10/2007 | Jin | 342/357.1 |

* cited by examiner

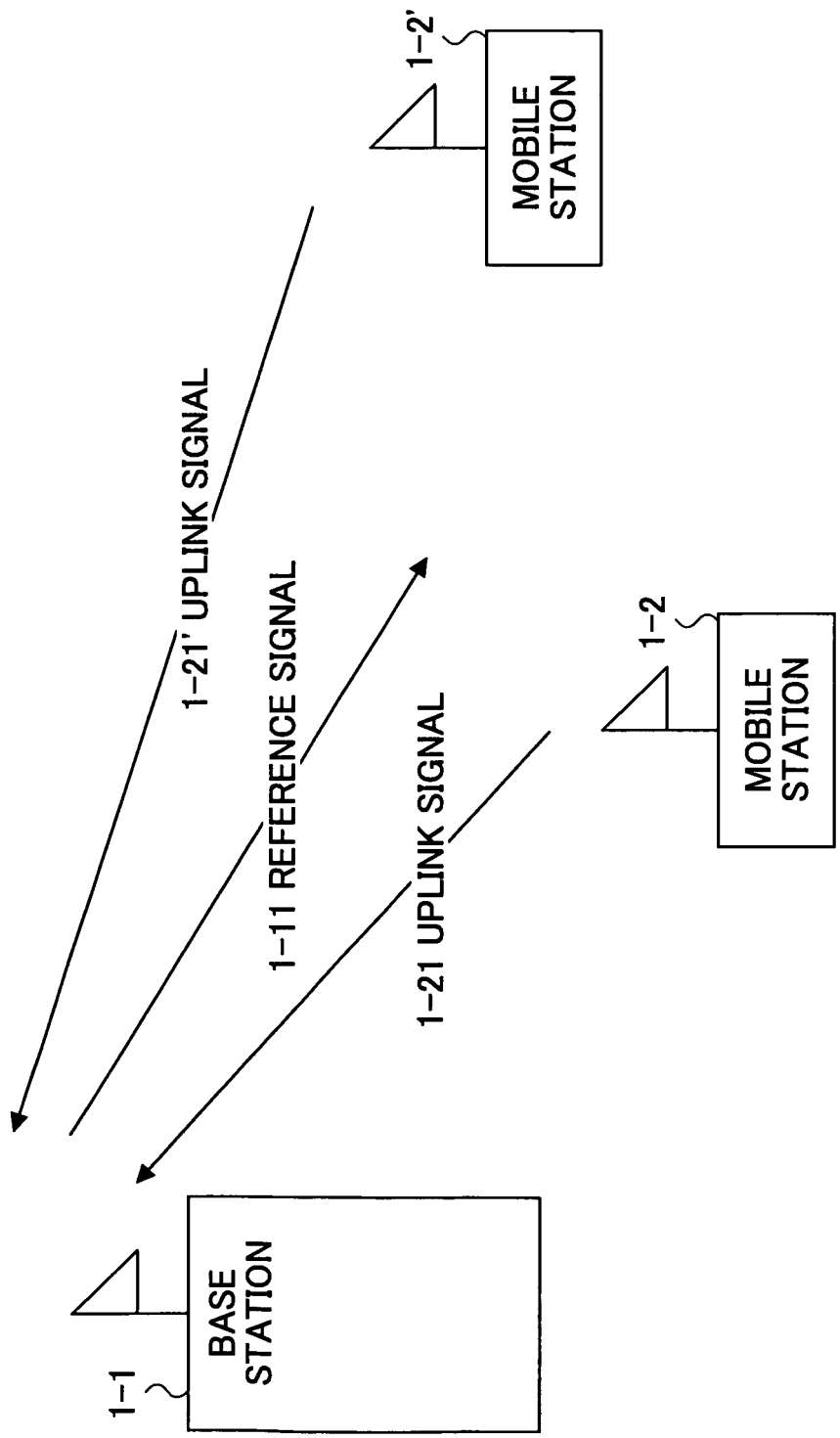

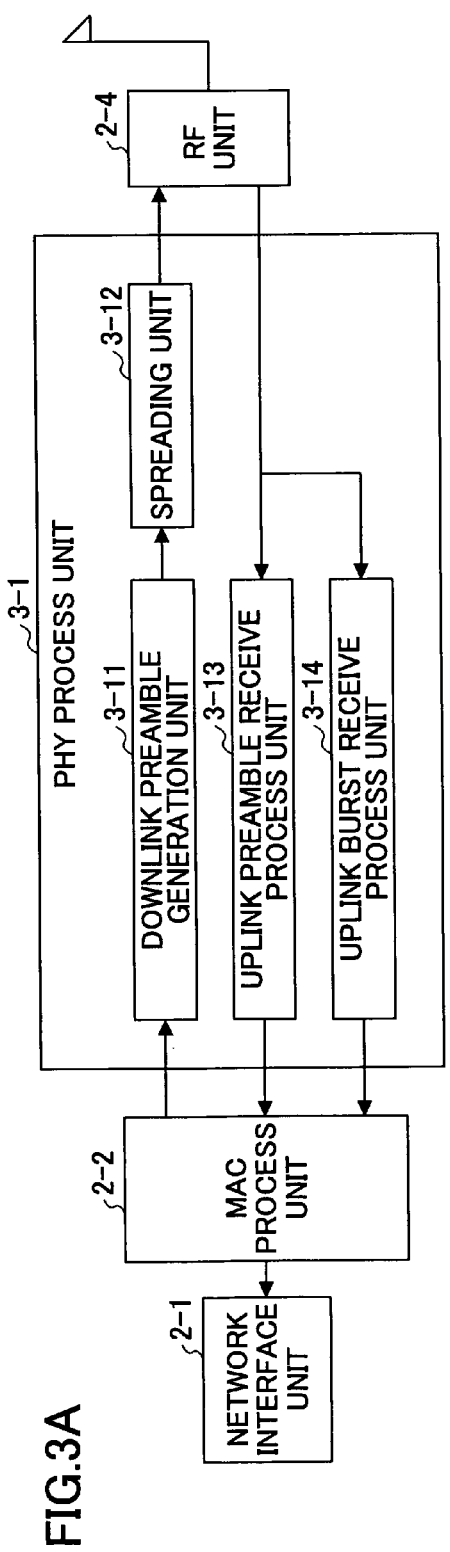
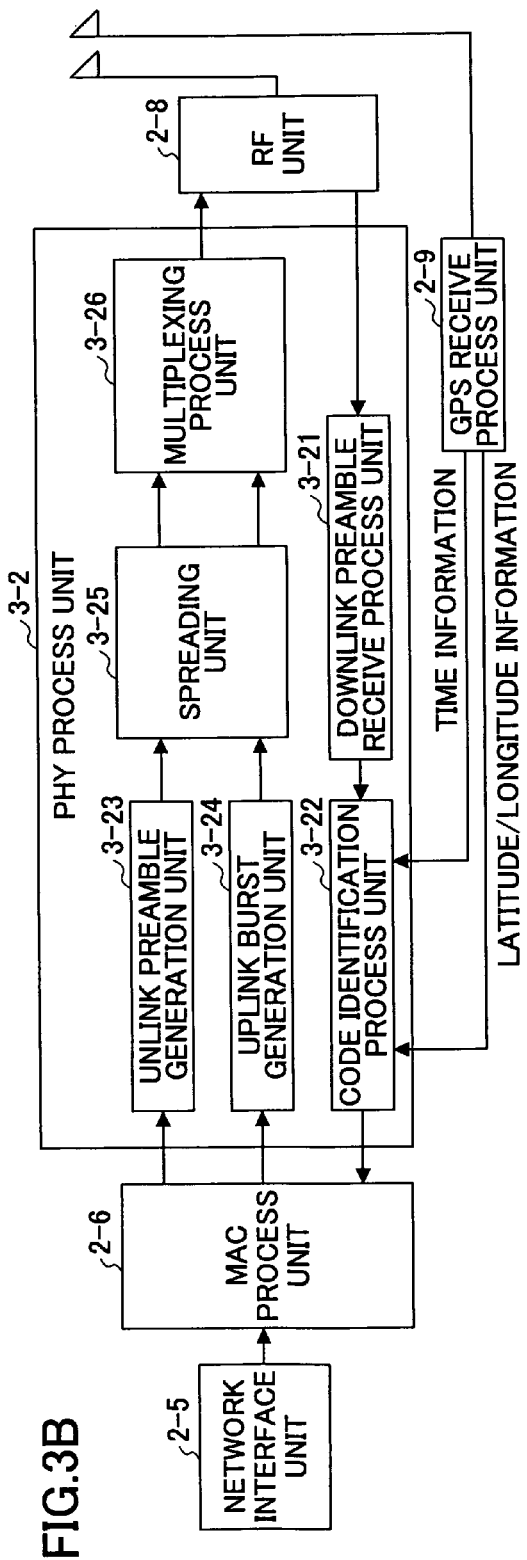
FIG.3A
FIG.3B

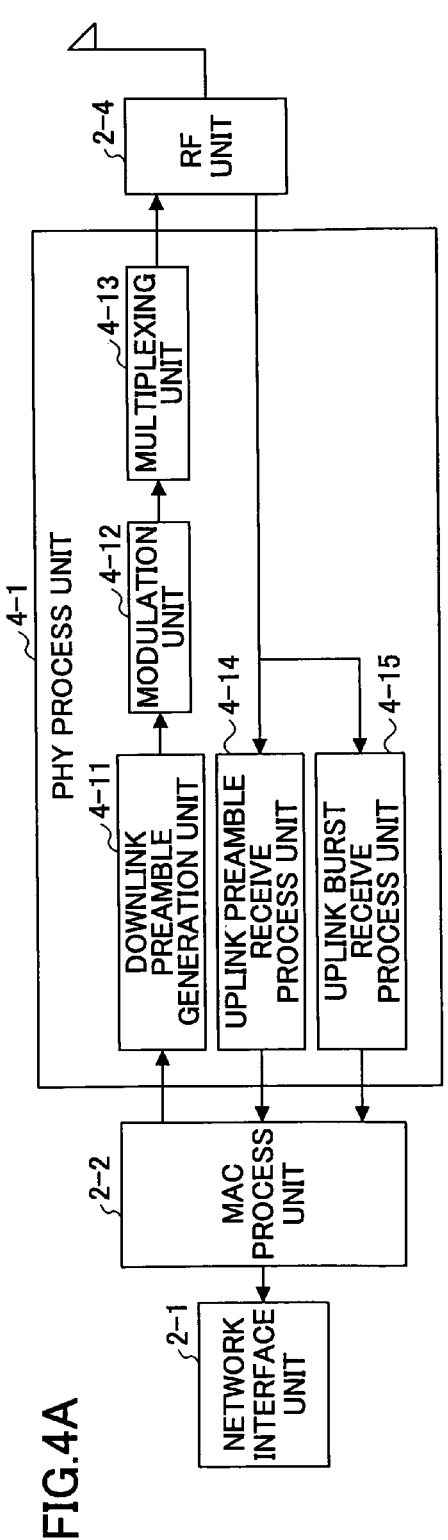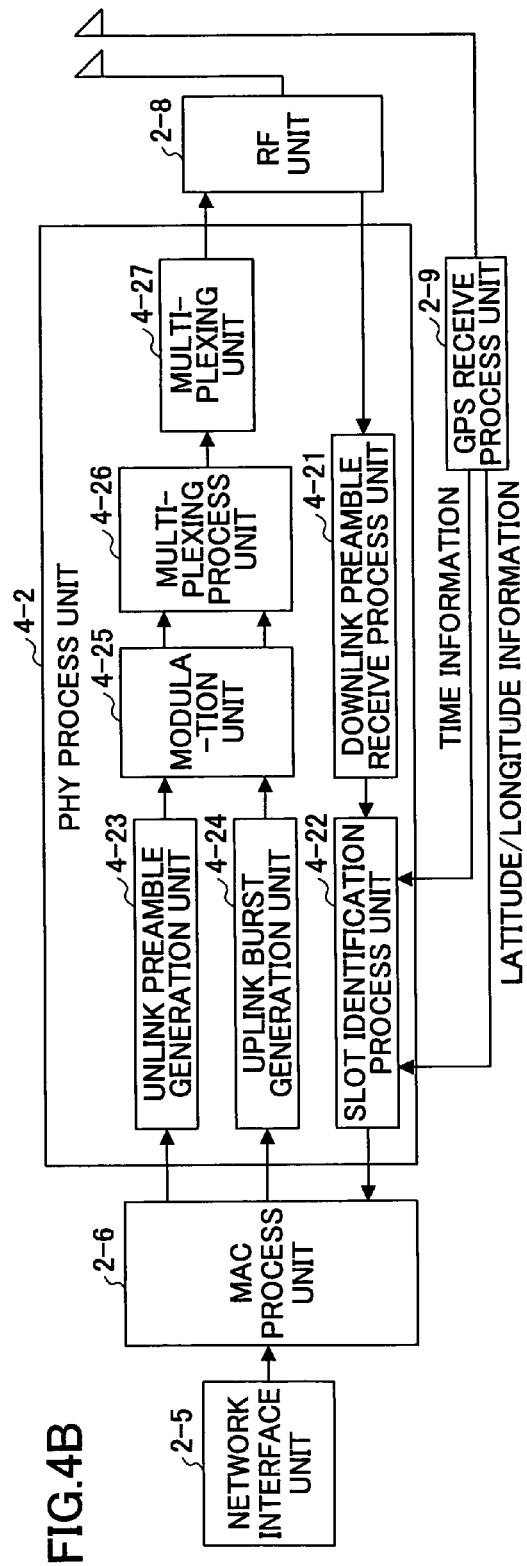

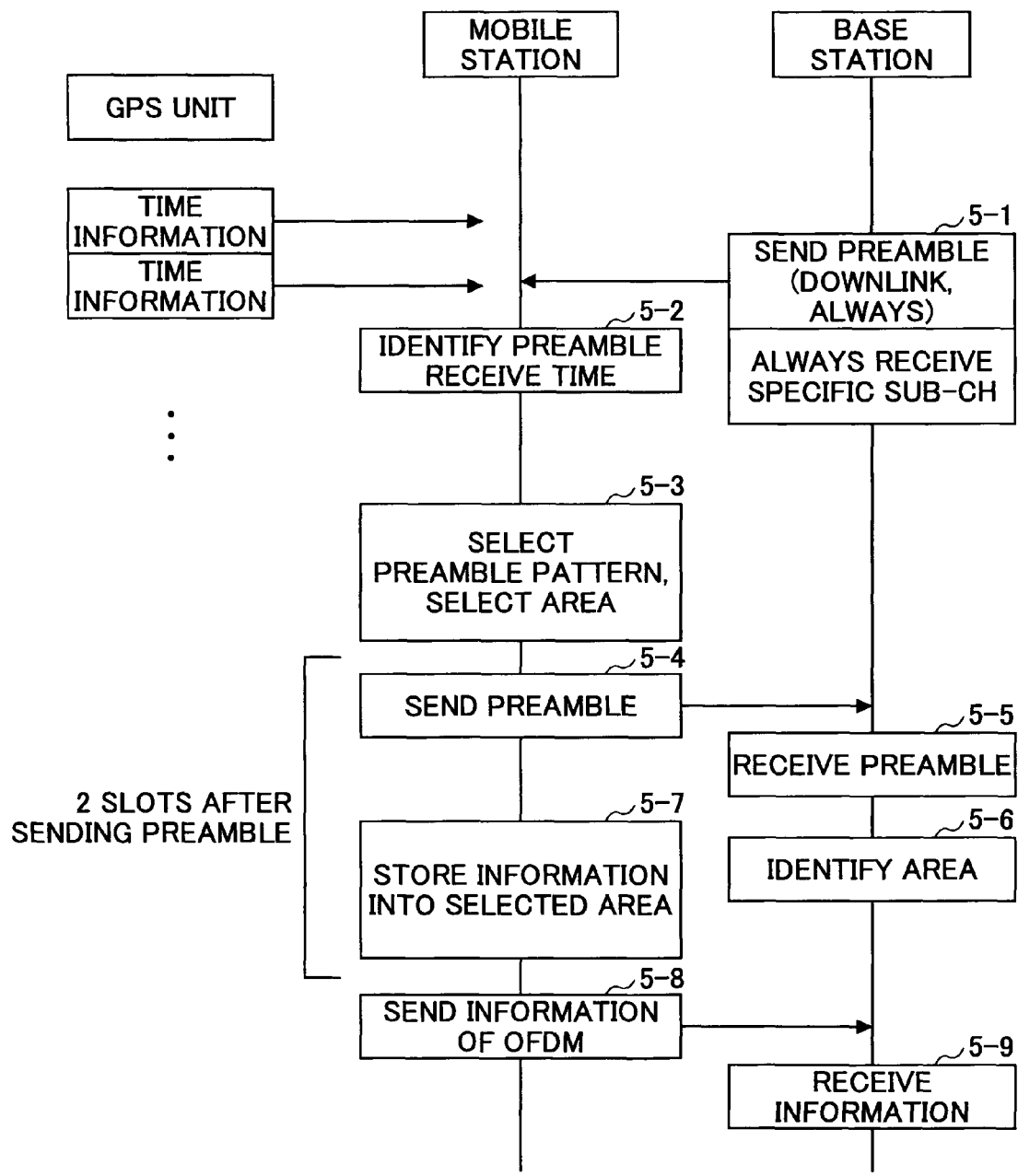

FIG.11

TIME INFORMATION ⇔ AREA CONVERSION TABLE

| TIME INFORMATION | AREA | NOTE |
|---|---|---|
| 00 : 00 : 00 | 0 | HOUR, MINUTE, SECOND |
| 00 : 00 : 01 | 1 | |
| ... | | |
| 00 : 00 : 59 | 59 | |
| 00 : 01 : 00 | 60 | |
| 00 : 02 : 00 | 120 | |
| 00 : 02 : 01 | 1 | |

FIG.12

TIME LATITUDE/LONGITUDE INFORMATION ⇔ AREA CONVERSION TABLE

| LATITUDE | LONGITUDE | TIME INFORMATION | AREA | NOTE |
|---|---|---|---|---|
| 00 : 00 : 0000 | 00 : 00 : 0000 | 00 : 00 : 00 | 0 | DEGREE, MINUTE, SECOND /HOUR, MINUTE, SECOND |
| 00 : 00 : 0001 | 00 : 00 : 0000 | 00 : 00 : 00 | 1 | |
| ... | ... | ... | | |
| 00 : 00 : 0059 | 00 : 00 : 0000 | 00 : 00 : 00 | 59 | |

FIG.13

TIME INFORMATION ⇔ CODE NUMBER CONVERSION TABLE

| TIME INFORMATION | CODE NUMBER | NOTE |
|---|---|---|
| 00 : 00 : 00 | 0 | HOUR, MINUTE, SECOND |
| 00 : 00 : 01 | 1 | |
| ... | | |
| 00 : 00 : 59 | 59 | |
| 00 : 01 : 00 | 60 | |

FIG.14

TIME LATITUDE/LONGITUDE INFORMATION ⇔ CODE NUMBER CONVERSION TABLE

| LATITUDE | LONGITUDE | TIME INFORMATION | CODE NUMBER | NOTE |
|---|---|---|---|---|
| 00 : 00 : 0000 | 00 : 00 : 0000 | 00 : 00 : 00 | 0 | DEGREE, MINUTE, SECOND /HOUR, MINUTE, SECOND |
| 00 : 00 : 0001 | 00 : 00 : 0000 | 00 : 00 : 00 | 1 | |
| ... | ... | ... | | |
| 00 : 00 : 0059 | 00 : 00 : 0000 | 00 : 00 : 00 | 59 | |

FIG.15

TIME INFORMATION ⇔ SLOT NUMBER CONVERSION TABLE

| TIME INFORMATION | SLOT NUMBER | NOTE |
|---|---|---|
| 00 : 00 : 00 | 0 | HOUR, MINUTE, SECOND |
| 00 : 00 : 01 | 1 | |
| ... | | |
| 00 : 00 : 59 | 59 | |
| 00 : 01 : 00 | 60 | |

FIG.16

TIME LATITUDE/LONGITUDE INFORMATION ⇔ SLOT NUMBER CONVERSION TABLE

| LATITUDE | LONGITUDE | TIME INFORMATION | SLOT NUMBER | NOTE |
|---|---|---|---|---|
| 00 : 00 : 0000 | 00 : 00 : 0000 | 00 : 00 : 00 | 0 | DEGREE, MINUTE, SECOND /HOUR, MINUTE, SECOND |
| 00 : 00 : 0001 | 00 : 00 : 0000 | 00 : 00 : 00 | 1 | |
| ... | ... | ... | | |
| 00 : 00 : 0059 | 00 : 00 : 0000 | 00 : 00 : 00 | 59 | |

COMMUNICATION METHOD, MOBILE STATION APPARATUS AND WIRELESS BASE STATION APPARATUS

BACKGROUND OF THE INVENTION

1. Field of the Invention

The present invention relates to an one-way communication method, a mobile station apparatus, a wireless base station apparatus. More particularly, the present invention relates to an one-way communication method for transmitting communication data in one direction from the mobile station apparatus to the wireless base station apparatus, and relates to the mobile station apparatus and the wireless base station apparatus used for carrying out the one-way communication method. By the way, in the following descriptions, the mobile station apparatus and the wireless base station apparatus are simply referred to as a mobile station and a base station.

2. Description of the Related Art

In a general cellular system, relationship between the base station and the mobile station with respect to communication control is a master/slave relationship. Therefore, it is general that the base station collectively manages transmission resource assignment so that the mobile station transmits communication data using the transmission resource reported from the base station. Examples of the transmission resource assignment are assignment of spreading code in a CDMA (Code Division Multiple Access) scheme, assignment sub-channels in OFDM (Orthogonal Frequency Division Multiplexing)/OFDMA (Orthogonal Frequency Division Multiple Access) schemes, and assignment of time-division slots in a TDMA (Time Division Multiple Access) scheme.

As a prior art document, Japanese Laid-Open Patent application No. 11-27231 (document 1) discloses a wireless communication system in which a base station and a mobile station are connected by OFDM. In the system, when the base station receives an access request from the mobile station, the base station assigns, to the mobile station, some sub-carriers from all sub-carries that can be assigned to the mobile station according to the amount of information communicated by the mobile station.

Japanese Laid-Open Patent Application No. 2001-103032 (document 2) discloses an OFDM modulation/demodulation circuit for processing an OFDM signal used in digital wireless communications. The OFDM modulation/demodulation circuit changes a transmission signal modulation scheme, a symbol rate, a ratio of error correction coding and the like according to transmission route environment in order to maximize a transmission speed.

Japanese Laid-Open Patent Application No. 2005-198215 (document 3) discloses a wireless communication system for performing transmission by the OFDM scheme using a plurality of sub-carriers orthogonal with each other in which a wireless transmission apparatus transmits a preamble signal before transmitting data signals.

Since the relationship between the base station and the mobile station is the master/slave relationship in the conventional wireless system, the mobile station requests the base station to assign transmission resources so as to send communication data via the base station using the wireless resources assigned based on the instruction of the base station when the mobile station sends one-way communication data to the base station and even when the mobile station sends data to another mobile station near the mobile station.

Thus, even when there is no downlink communication data from the base station to the mobile station, the base station should send a connection control signal using a broadcast signal and the like. In addition, even for communication data to be transmitted between closely located mobile stations, it is necessary to send and receive a resource assignment request and a resource assignment report via the base station. Thus, in terms of effective use of transmission resources such as transmission frequencies, the conventional wireless system is inefficient in which resources are used uselessly.

SUMMARY OF THE INVENTION

The present invention is contrived in view of the above-mentioned problem. According to an embodiment of the present invention the above-mentioned problem is solved by a communication method, wherein:

a wireless base station apparatus periodically sends a reference signal to a mobile station apparatus;

the mobile station apparatus selects resources to be used for sending communication data to the wireless base station apparatus based on a receive time when receiving the reference signal first;

the mobile station apparatus sends information on selected resources to the wireless base station apparatus, and sends communication data to the wireless base station apparatus using the selected resources;

the wireless base station apparatus receives and demodulates the communication data based on information on the resources sent from the mobile station apparatus.

The mobile station apparatus may include:

a resource selection unit configured to receive a reference signal that is periodically sent from a wireless base station apparatus and to select resources to be used for sending communication data to the wireless base station apparatus based on a receive time when receiving the reference signal first;

a information send unit configured to send information on selected resources to the wireless base station apparatus; and a data send unit configured to send communication data to the wireless base station apparatus using the selected resources.

In addition, the wireless base station apparatus may include:

a unit configured to periodically send a reference signal to a mobile station apparatus;

a unit configured to receive information on resources used for sending communication data, wherein the resources are selected based on a receive time when receiving the reference signal first by the mobile station apparatus; and a unit configured to receive and demodulate, based on the information on the resources, the communication data sent from the mobile station apparatus using the resources.

According to the embodiment of the present invention, the mobile station receives a periodic reference signal from the wireless base station apparatus so as to select resources to be used for uplink transmission of communication data based on the receive time of the reference signal irrespective of resource management in the wireless base station apparatus. Thus, it becomes unnecessary to send and receive signals for requesting and reporting resource assignment so that the mobile station apparatus can perform one-way communications to the base station apparatus on its own easily and quickly.

In addition, according to the embodiment of the present invention, the mobile station can select resources to be used for uplink transmission of communication data based on the latitude/longitude of the receiving position of the reference signal in addition to the receive time. Thus, even when a plurality of mobile station apparatuses enters a wireless area of a wireless base station apparatus at the same time, since latitude/longitude information are different for each mobile station apparatus, different resources can be selected for each mobile station apparatus.

BRIEF DESCRIPTION OF THE DRAWINGS

Other objects, features and advantages of the present invention will become more apparent from the following detailed description when read in conjunction with the accompanying drawings, in which:

FIG. 1 shows a basic configuration and operation outline of one-way communication according to an embodiment of the present invention;

FIG. 3A and FIG. 3B show configurations of a base station and a mobile station of the CDMA scheme respectively;

FIGS. 4A and 4B show configurations of a base station and a mobile station of the TDMA scheme respectively;

FIG. 5 shows a flowchart of sending operation based on time information in the OFDM/OFDMA scheme according to an embodiment;

FIG. 11 shows a correspondence table including time information and area numbers in the OFDM/OFDMA scheme;

FIG. 12 shows a correspondence table including time information, latitude/longitude information and area numbers in the OFDM/OFDMA scheme;

FIG. 13 shows a correspondence table including time information and spreading code numbers in the CDMA scheme;

FIG. 14 shows a correspondence table including time information, latitude/longitude information and spreading code numbers in the CDMA scheme;

FIG. 15 shows a correspondence table including time information and slot numbers in the TDMA scheme;

FIG. 16 shows a correspondence table including time information, latitude/longitude information and slot numbers in the TDMA scheme.

DETAILED DESCRIPTION OF THE PREFERRED EMBODIMENTS

In the following, embodiments of the present invention are described with reference to figures.

FIG. 1 shows a basic configuration and an operation outline of one-way communication according to an embodiment of the present invention. In the following, a transmission direction from a base station 1-1 to a mobile station 1-2 is referred to as a downlink direction, and the transmission line is referred to as a downlink line, and the signal is referred to as a downlink signal. A transmission direction from the mobile station 1-2 to the base station 1-1 is referred to as an uplink direction, and the transmission line is referred to as an uplink line, and the signal is referred to as an uplink signal.

The base station 1-1 always periodically sends a reference signal 1-11 such as a preamble signal or a unique word (UW) signal indicating a start position etc. of a wireless frame. When the mobile station (1-2, 1-2') enters the wireless area of the base station 1-1, the mobile station stores a time when receiving the reference signal 1-11 first and stores latitude/longitude information of the receiving position. When the mobile station (1-2, 1-2') sends an uplink signal of communication data to the base station 1-1, the mobile station derives, from the stored receiving time and the latitude/longitude information, transmission resources to be used for sending the uplink signal so that the mobile station sends the uplink signal (1-21, 1-21') using the wireless resources.

The transmission resources may be burst areas in which a plurality of sub-channels having different carrier frequencies are combined in a case where the OFDM/OFDMA scheme is used, may be spreading code when the CDMA scheme is used, and may be time division slots when the TDMA scheme is used. In addition, the receiving time and the latitude/longitude information of the receiving position can be obtained based on GPS information sent from a GPS (Global Positioning System). The receiving time can be also obtained by receiving the standard frequency and time signal waves that are transmitted for wave clocks.

Figure 2A:
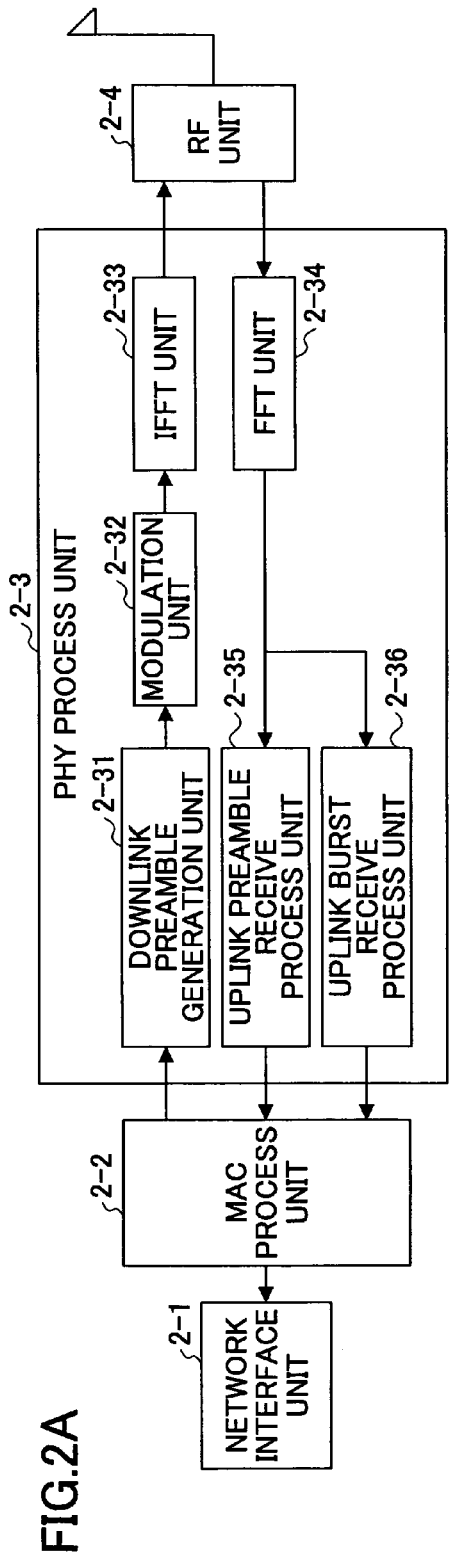
FIG. 2A and FIG. 2B show configurations of the base station and the mobile station of the OFDM/OFDMA scheme respectively.
Figure 2B:
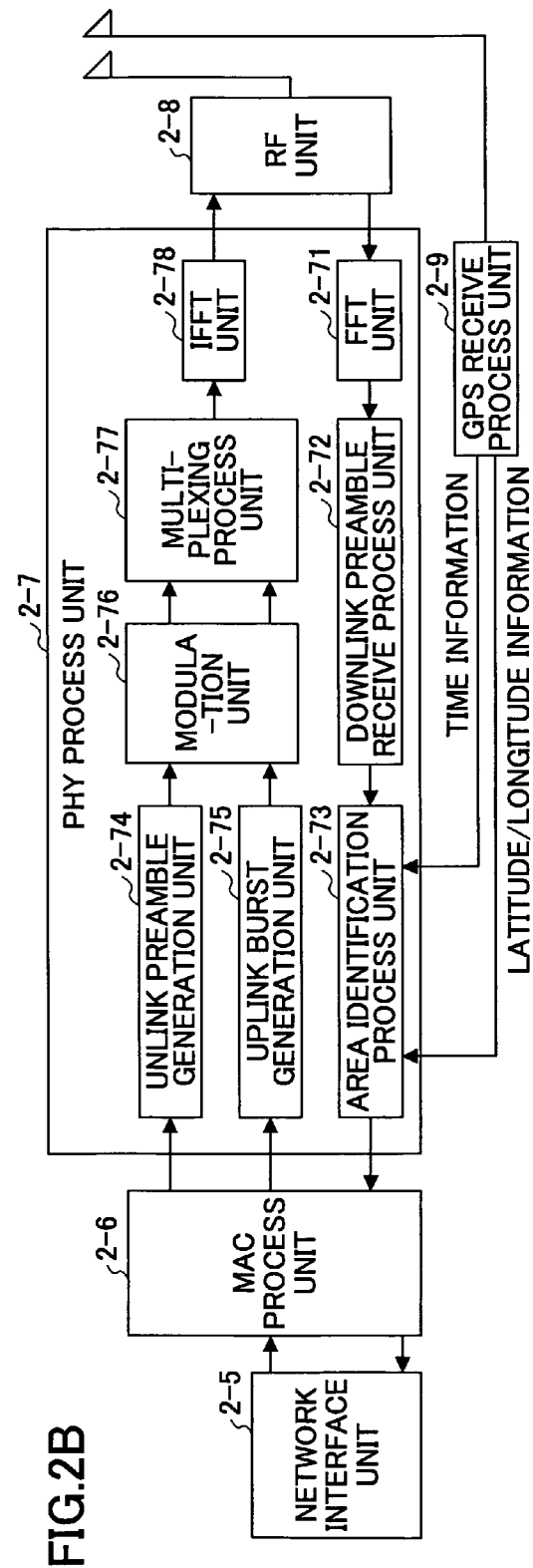

FIG. 2A and FIG. 2B show configurations of the base station and the mobile station of the OFDM/OFDMA scheme respectively. As shown in FIG. 2A, the base station includes a network interface unit 2-1, a MAC process unit 2-2, a PHY process unit 2-3, and a RF unit 2-4. When performing TDD (Time Division Duplex) communication, a receive process unit is added for receiving GPS information from the GPS.

The network interface unit 2-1 includes a function for sending communication data received from the mobile station to the network side. The MAC process unit 2-2 includes an instruction function for sending a downlink preamble signal, and a function for identifying a burst area to be used for sending communication data by the mobile station based on an uplink preamble signal and reporting the burst area to an uplink burst receive process unit 2-36 of the PHY process unit 2-3. In addition, the MAC process unit 2-2 includes a receive side MAC layer process function based on WiMAX (Worldwide Interoperability for Microwave Access). By the way, WiMAX is a standard of fixed wireless communication approved by the IEEE (Institute of Electrical and Electronics Engineers).

The PHY process unit 2-3 includes a downlink preamble generation unit 2-31, a modulation unit 2-32 and an inverse fast Fourier transform (iFFT) unit 2-33, a fast Fourier transform unit 2-34, an uplink preamble receive process unit 2-35 and an uplink burst receive process unit 2-36. In the units, the downlink preamble generation unit 2-31, the modulation unit 2-32 and the inverse fast Fourier transform (iFFT) unit 2-33 are function units for sending, and the fast Fourier transform unit 2-34, the uplink preamble receive process unit 2-35 and the uplink burst receive process unit 2-36 are function units for receiving.

The downlink preamble generation unit 2-31 generates a preamble symbol specified from the MAC process unit 2-2. The modulation unit 2-32 performs QPSK modulation for the preamble signal generated by the downlink preamble generation unit 2-31. The inverse fast Fourier transform unit 2-33 performs inverse fast Fourier transform on the signal output from the modulation unit 2-32 using a parameter specified by the MAC process unit 2-2, and sends an output signal to the RF unit 2-4. The RF unit 2-4 sends/receives wireless signals by performing conversion to a radio frequency (RF) for the baseband signal of the PHY process unit 2-3, and performs the inverse conversion.

The fast Fourier transform unit 2-34 performs fast Fourier transform on a signal sent from the mobile station and input from the RF unit 2-4 using a parameter specified by the MAC process unit 2-2. The uplink preamble receive process unit 3-35 demodulates the uplink preamble signal sent in the Ranging area in the WiMAX standard and sends the uplink preamble signal to the MAC process unit 2-2. The uplink burst receive process unit 2-36 demodulates communication data of the burst area defined based on the instruction from the MAC process unit 2-2.

As shown in FIG. 2B, the mobile station of the OFDM/OFDMA scheme includes a network interface unit 2-5, a MAC process unit 2-6, a PHY process unit 2-7, a RF unit 2-8, and a GPS receive process unit 2-9. The network interface unit 2-5 includes an interface function for converting communication information input to the mobile station into a MAC layer signal format.

The MAC process unit 2-6 performs MAC layer processes on the communication information output from the network interface unit 2-5. In addition to that, the MAC process unit 2-6 instructs to send an uplink preamble signal conforming to a format of the WiMAX standard at a predetermined uplink line transmission timing, wherein the uplink preamble signal includes information of a use burst area of the uplink line according to an instruction from an area identification process unit 2-73 in the PHY process unit 2-7.

The RF unit 2-8 sends/receives wireless signals by performing conversion between the baseband signal of the PHY process unit 2-7 and the radio frequency (RF). The GPS receive process unit 2-9 includes a function for receiving time information and latitude/longitude information sent from the GPS, and a function for send the information to the PHY process unit 2-7.

The PHY process unit 2-7 includes a fast Fourier transform unit 2-71, a downlink preamble receive process unit 2-72, the area identification process unit 2-73, an uplink preamble generation unit 2-74, an uplink burst generation unit 2-75, a modulation unit 2-76, a multiplexing process unit 2-77 and an inverse fast Fourier transform unit 2-78.

The fast Fourier transform (FFT) unit 2-71 performs fast Fourier transform using a parameter specified by the MAC process unit 2-6. The downlink preamble receive process unit 2-72 demodulates the downlink preamble signal sent from the base station. The area identification process unit 2-73 identifies the time when receiving the downlink preamble signal and the latitude/longitude of the receiving position from the time information and the latitude/longitude information from the GPS receive process unit 2-9 and the downlink preamble signal from the downlink preamble receive process unit 2-72 so as to designate, for the MAC process unit 2-6, the burst area of an uplink line based on an after-mentioned uplink line use rule.

The uplink preamble generation unit 2-74 generates the uplink preamble signal based on the instruction from the MAC process unit 2-6. The uplink preamble signal is generated so as to include information of the burst area used by the uplink signal of the mobile station. The uplink burst generation unit 2-75 performs physical (PHY) layer processes on communication data output from the MAC process unit 2-6.

The modulation unit 2-76 performs QPSK modulation for the uplink preamble signal, and performs QPSK or multilevel modulation etc. based on an instruction from the MAC process unit 206 for the uplink burst signal. The multiplexing process unit 2-77 performs multiplexing processes on the uplink preamble signal and the uplink burst signal. The inverse fast Fourier transform (iFFT) unit 2-78 performs inverse fast Fourier transform on the send signal output from the multiplexing process unit 2-77 using a parameter specified by the MAC process unit 2-6, and outputs the result to the RF unit 2-8.

FIG. 3A and FIG. 3B show configurations of a base station and a mobile station of the CDMA scheme respectively. In the following, main configurations different from those of the OFDM/OFDMA scheme described with reference to FIGS. 2A and 2B are described. The main different configurations as the base station of the CDMA scheme are a downlink preamble generation unit 3-11 for generating a downlink preamble signal, a spreading unit 3-12, an uplink preamble receive process unit 3-13 for receiving an uplink preamble signal and an uplink burst receive process unit 3-14 for receiving an uplink burst signal in a PHY process unit 3-1. Differences in each function unit are based on differences of the modulation scheme between OFDM modulation and CDMA modulation in the physical layer processing. The CDMA scheme is provided with a send/receive function of a signal by spreading/despreading in place of the send/receive function of a signal based on the orthogonal wave frequency modulation/demodulation.

In addition, although the preamble signal does not exist in the downlink line in a conventional mobile communication system of the W-CDMA scheme, the preamble signal is added in this embodiment as identification information of the base station and as a signal indicating a head timing of a wireless frame. With respect to an added channel, the preamble signal used in a random access channel of the uplink line of the 3GPP standard can be added to the downlink line similarly.

FIG. 3B shows a configuration of a mobile station of the CDMA scheme. The main configurations different from those of the OFDM/OFDMA scheme of FIG. 2B are a downlink preamble receive process unit 3-21, a code identification process unit 3-22, an uplink preamble generation unit 3-23, an uplink burst generation unit 3-24, a spreading unit 3-25 and a multiplexing process unit 3-26 in a PHY process unit 3-2.

The downlink preamble receive process unit 3-21 receives a downlink preamble signal. The code identification process unit 3-22 identifies the time when receiving the downlink preamble signal and the latitude/longitude of the receiving position and instructs the MAC process unit 2-6 to send an uplink signal based on the identification result. The uplink preamble generation unit 3-23 generates an uplink preamble signal according to the instruction from the MAC process unit 2-6. The uplink burst generation unit 3-24 performs physical (PHY) layer processing on communication data to be sent according to the instruction from the MAC process unit 2-6. The spreading unit 3-25 spreads the uplink preamble signal and the uplink burst signal. The multiplexing process unit 3-26 multiplexes output signals output from the spreading unit 3-25.

Differences in each function unit from the OFDM/OFDMA scheme are based on differences of the modulation scheme between OFDM modulation and CDMA modulation in the physical layer processing. The CDMA scheme is provided with a send/receive function of a signal by spreading/despreading in place of the send/receive function of a signal based on the orthogonal wave frequency modulation/demodulation. By the way, although a conventional CDMA mobile station does not include a function for receiving the downlink preamble signal, a CDMA mobile station of this embodiment includes a preamble signal receive function similar to the base station.

FIGS. 4A and 4B show configurations of a base station and a mobile station of the TDMA scheme respectively. In the following, main configurations different from those of the OFDM/OFDMA scheme described with reference to FIGS. 2A and 2B are described. The main different configurations as the base station of the scheme are a downlink preamble generation unit 4-11, a modulation unit 4-12, a multiplexing unit 4-13, an uplink preamble receive process unit 4-14 and an uplink burst receive process unit 4-15 in a PHY process unit 4-1.

Differences in each function unit from the OFDM/OFDMA scheme are based on differences of the modulation scheme between OFDM modulation and TDMA modulation. In the TDMA scheme, a corresponding function is replaced with a function for sending communication data by assigning communication data of each user to each slot in a time division frame. In the downlink preamble generation unit 4-11 in the base station, a function for generating a unique word (UW) signal of the TDMA scheme is used. In addition, the multiplexing unit 4-13 is configured to multiplex send signals in the time axis direction instead of the frequency axis direction.

FIG. 4B shows a configuration of a mobile station of the TDMA scheme. The main configurations different from those of the OFDM/OFDMA scheme of FIG. 2B are a downlink preamble receive process unit 4-21, a slot identification process unit 4-22, an uplink preamble generation unit 4-23, an uplink burst generation unit 4-24, a modulation unit 4-25, a multiplexing process unit 4-26 and a multiplexing unit 4-27 in a PHY process unit 4-2.

The downlink preamble receive process unit 4-21 receives a downlink preamble signal. The slot identification process unit 4-22 identifies the time when receiving the downlink preamble signal and the latitude/longitude of the receiving position and instructs the MAC process unit 2-6 to send an uplink signal based on the identification result. The uplink preamble generation unit 4-23 generates an uplink preamble signal according to the instruction from the MAC process unit 2-6. The uplink burst generation unit 4-24 performs physical (PHY) layer processing on communication data to be sent according to the instruction from the MAC process unit 2-6. The modulation unit 4-25 modulates the uplink preamble signal and the uplink burst signal. The multiplexing process unit 4-26 and the multiplexing unit 4-27 multiplex output signals output from the modulation unit 4-25.

Differences in each function unit from the OFDM/OFDMA scheme are based on differences of the modulation scheme between OFDM modulation and TDMA modulation in the physical layer processing. The TDMA scheme is provided with a send/receive function of a signal by time division multiplexing/time division demultiplexing in place of the send/receive function of a signal based on the orthogonal wave frequency modulation/demodulation, so that the mobile station uses slot information as the burst area used for sending communication data.

FIG. 5 shows a flowchart of operation of sending based on time information in the OFDM/OFDMA scheme according to this embodiment. In this sending operation, the base station periodically sends the downlink preamble signal in step 5-1. When the mobile station enters a communication area of the base station, the mobile station identifies a time when receiving the downlink preamble signal first from information of the GPS receiving unit provided in the mobile station in step 5-2.

The mobile station extracts burst area information of the uplink line from a table including correspondences between time information and area numbers shown in FIG. 11, and selects a pattern of an uplink preamble signal including burst area instruction information of the uplink line in step 5-3. Then, the mobile station sends the uplink preamble signal to the base station in step 5-4. The base station receives the uplink preamble signal from the mobile station in step 5-5, and demodulates the uplink preamble signal so as to identify which burst area is used by the mobile station for sending communication data in step 5-6.

After the mobile station sends the uplink preamble signal, the mobile station processes communication data using each function unit shown in FIG. 2B, and stores the data in the uplink line burst area according to FIG. 11 in step 5-7. After that, the mobile station sends an OFDM/OFDMA signal of the communication data to the base station after a predetermined interval, for example, two slots after sending the uplink preamble signal in step 5-8.

Two slots after receiving the uplink preamble signal for example, the base station receives and demodulates communication data in the burst area identified based on the burst area instruction information of the uplink preamble signal in step 5-9. The "two slots" is an example of a period necessary for identifying the uplink link burst area in the base station and necessary for preparation of receiving.

Figure 6:
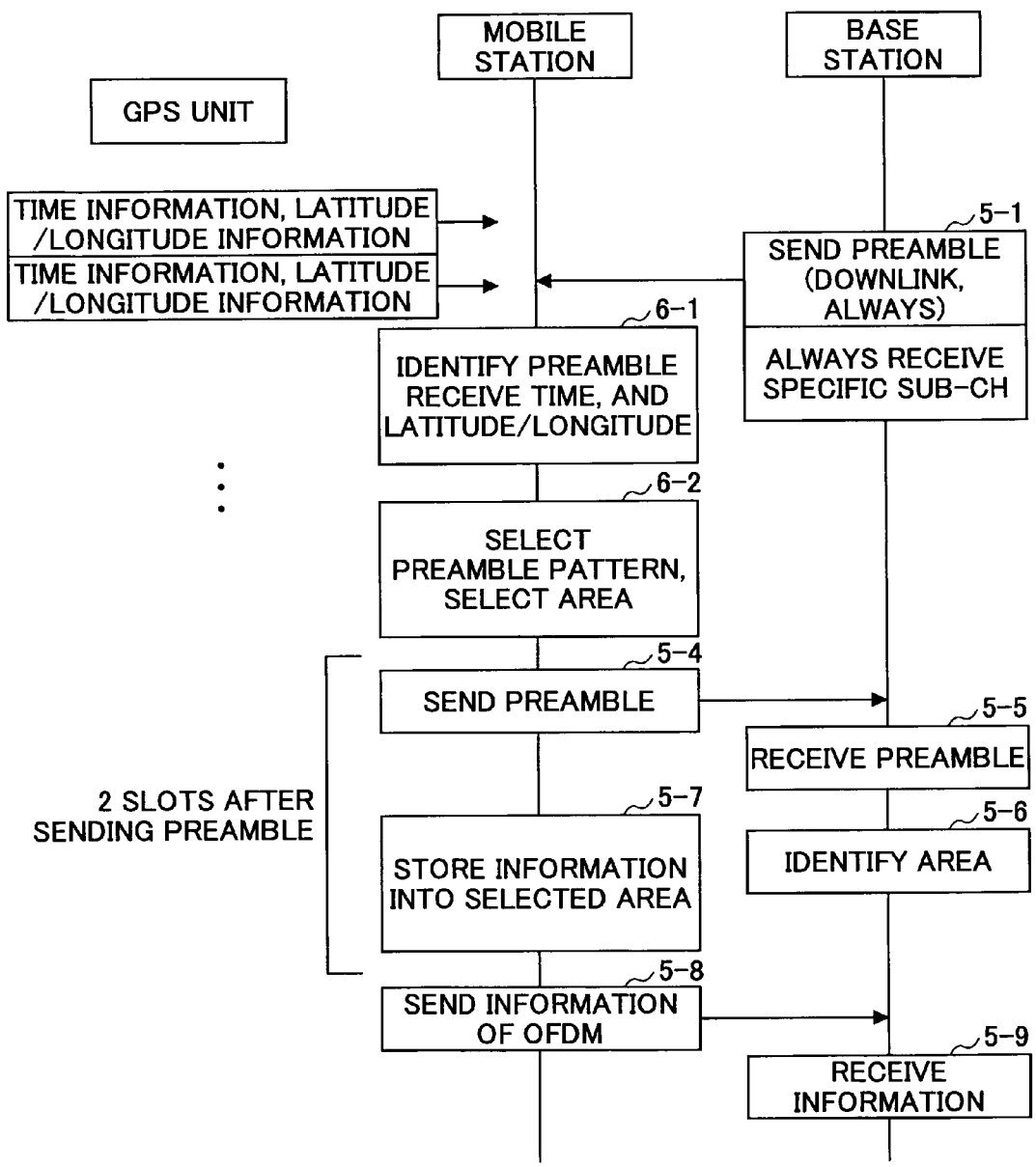
FIG. 6 shows a flowchart of sending operation based on time and latitude/longitude information in the OFDM/OFDMA scheme according to an embodiment.

FIG. 6 shows a flowchart of operation for sending based on the time and latitude/longitude information in the OFDM/OFDMA scheme according to this embodiment. Compared with the flowchart of FIG. 5, in this sending operation, the parameters for determining the uplink line burst area include the latitude/longitude information of the receiving position shown in FIG. 12 in addition to the receive time information of the downlink preamble signal, so that the mobile station identifies the time when receiving the downlink preamble signal and the latitude/longitude information of the receiving position in step 6-1. Then, the mobile station determines the burst area of the uplink line based on the identified information so as to select a pattern of the uplink preamble signal in step 6-2. Other steps are similar to corresponding steps of FIG. 5.

Figure 7:
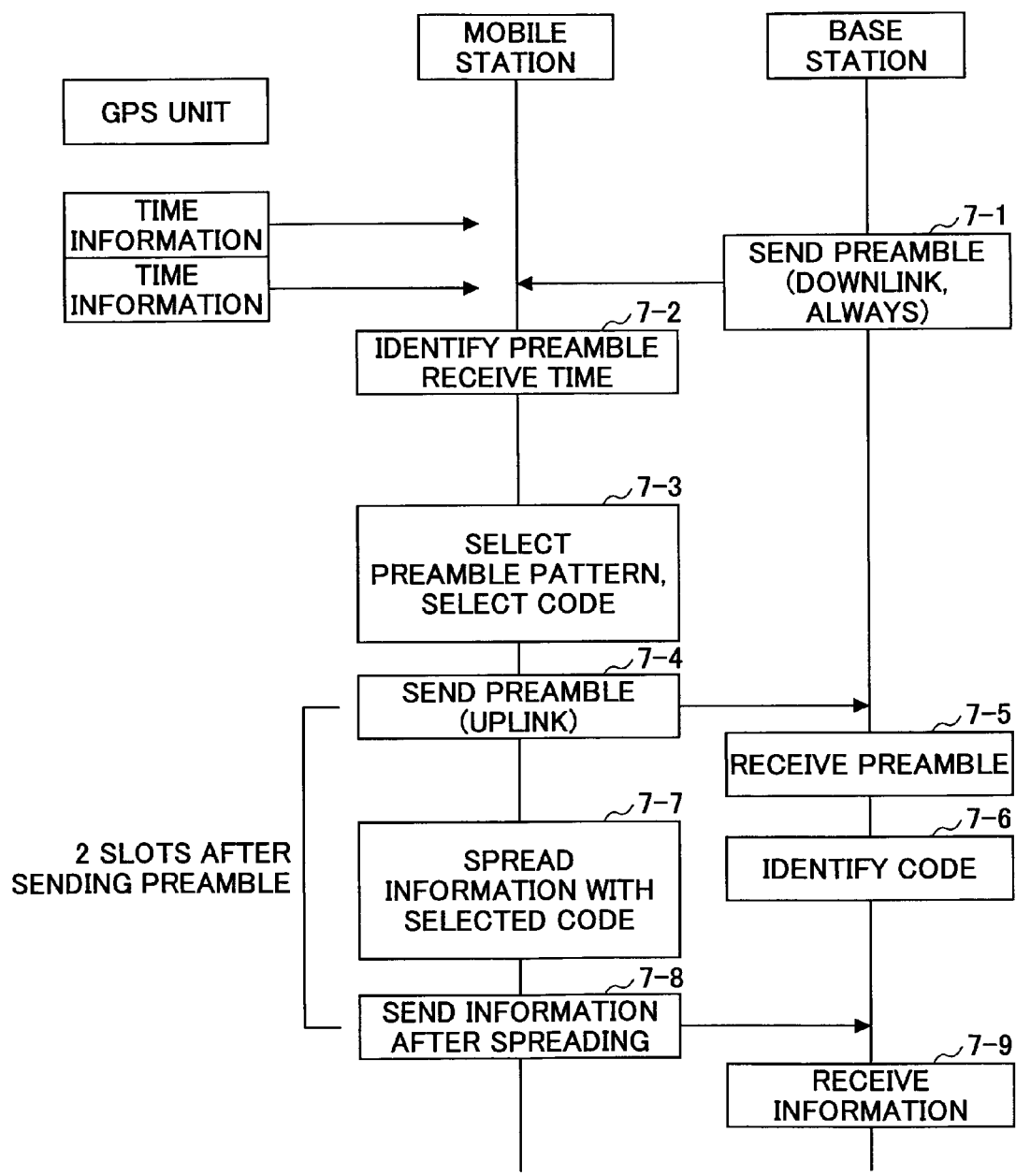
FIG. 7 shows a flowchart of sending operation based on time information in the CDMA scheme according to an embodiment.

FIG. 7 shows a flowchart of operation of sending based on time information in the CDMA scheme according to this embodiment. In this sending operation, spreading code used for spreading in the CDMA scheme is determined instead of the burst area in the OFDM/OFDAM scheme shown in FIG. 5. Then, a number of the spreading code is reported to the base station using an uplink preamble signal so as to send communication data using the spreading code. FIG. 13 shows an configuration example of a conversion table used for converting a receiving time of a downlink preamble signal to the spreading code number.

The base station periodically sends the downlink preamble signal in step 7-1. When the mobile station enters a communication area of the base station, the mobile station identifies a time when receiving a downlink preamble signal first from information of the GPS receiving unit provided in the mobile station in step 7-2. The mobile station extracts the spreading code number of the uplink line from the table including correspondences between time information and code numbers shown in FIG. 13, and selects a pattern of the uplink preamble signal including the spreading code number of the uplink line in step 7-3. Then, the mobile station sends the uplink preamble signal to the base station in step 7-4.

The base station receives the uplink preamble signal from the mobile station in step 7-5, and demodulates the uplink preamble signal so as to identify which spreading code is used by the mobile station for sending communication data in step 7-6. After the mobile station sends the uplink preamble signal, the mobile station processes communication data using each function unit shown in FIG. 3B, and spreads data with the spreading code according to FIG. 13 in step 7-7.

After that, the mobile station sends a CDMA signal of the communication data to the base station after a predetermined interval, for example, two slots after sending the uplink preamble signal in step 7-8. Two slots after receiving the uplink preamble signal for example, the base station receives communication data from the mobile station, and despreads it based on the spreading code number of the uplink preamble signal so as to demodulate the communication data in step 7-9.

Figure 8:
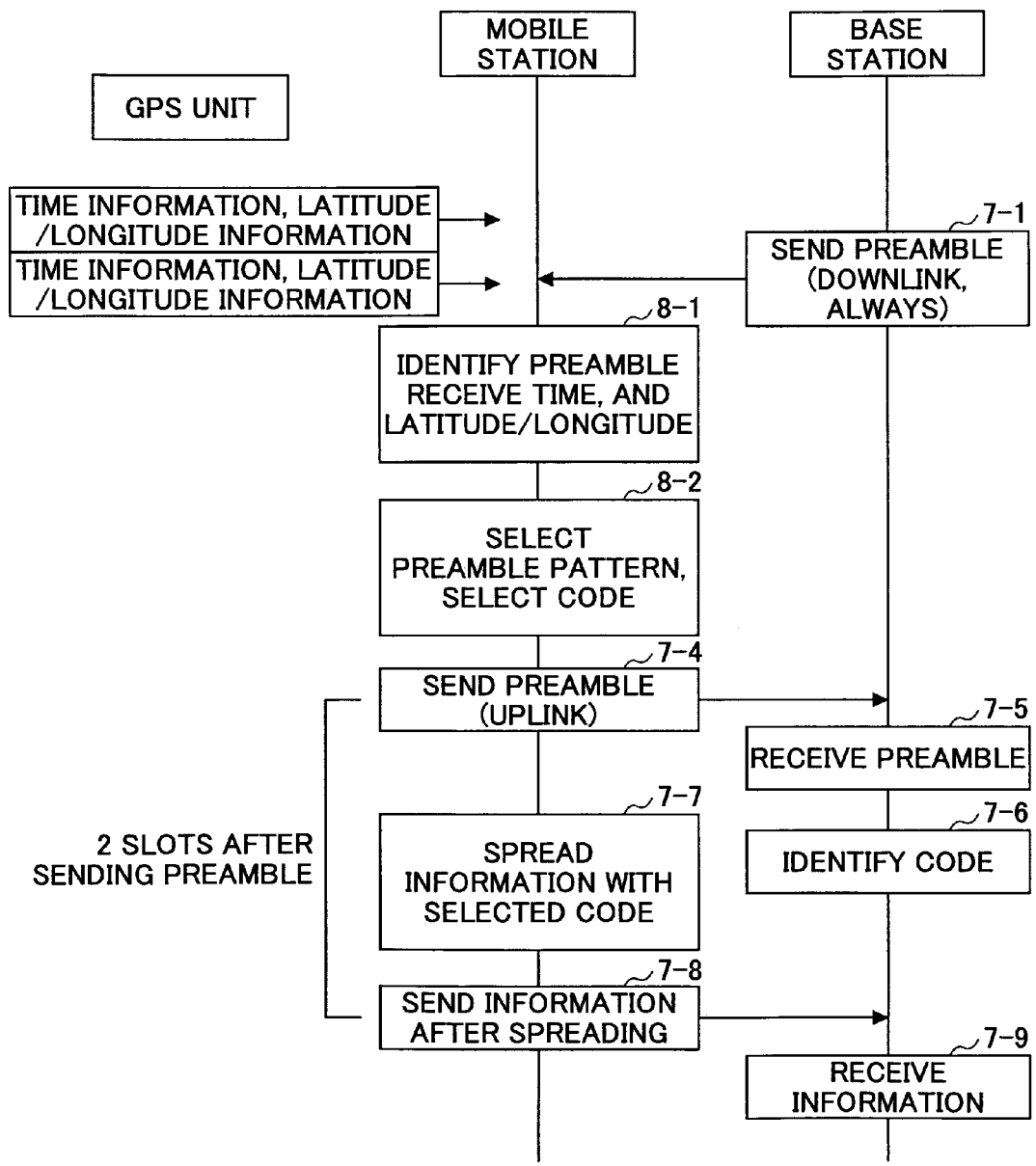
FIG. 8 shows a flowchart of sending operation based on time and latitude/longitude information in the CDMA scheme according to an embodiment.

FIG. 8 shows a flowchart of operation of sending based on the time and the latitude/longitude information in the CDMA scheme according to this embodiment. Compared with the flowchart of FIG. 7, in this sending operation, the parameters for determining the uplink line spreading code include latitude/longitude information of the receiving position shown in FIG. 14 in addition to the receive time information of the downlink preamble signal, so that the mobile station identifies the time when receiving the downlink preamble signal and the latitude/longitude information of the receiving position in step 8-1. Then, the mobile station determines the spreading code of the uplink line based on the identified information so as to select a pattern of the uplink preamble signal in step 8-2. Other steps are similar to corresponding steps of FIG. 7.

Figure 9:
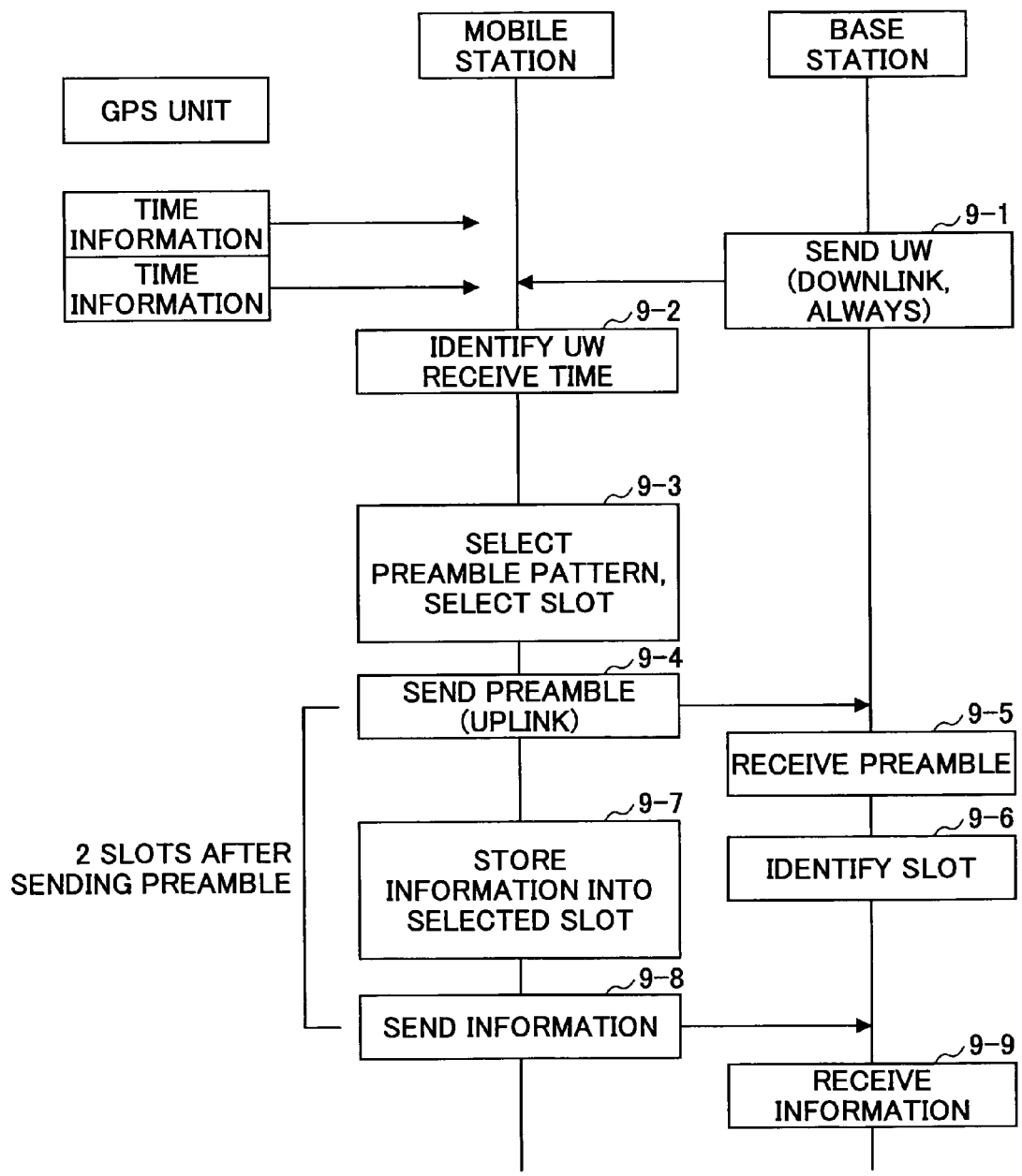
FIG. 9 shows a flowchart of sending operation based on time information in the TDMA scheme according to an embodiment.

FIG. 9 shows a flowchart of operation of sending based on time information in the TDMA scheme according to this embodiment. In this sending operation, a slot of a time division frame is determined instead of the burst area in the OFDM/OFDAM scheme shown in FIG. 5. Then, communication data are sent using the slot based on the TDMA scheme. FIG. 15 shows an configuration example of a conversion table used for converting the receiving time to a slot number.

The base station periodically sends a downlink unique word (UW) signal as a preamble signal in step 9-1. When the mobile station enters a communication area of the base station, the mobile station identifies a time when receiving the unique word (UW) signal first from information of the GPS receiving unit provided in the mobile station in step 9-2. The mobile station extracts a slot number of the uplink line from the table including correspondences between time information and slot numbers shown in FIG. 15, and selects a pattern of the uplink preamble signal including the slot number of the uplink line in step 9-3. Then, the mobile station sends the uplink preamble signal to the base station in step 9-4.

The base station receives the uplink preamble signal from the mobile station in step 9-5, and demodulates the uplink preamble signal so as to identify which slot is used by the mobile station for sending communication data in step 9-6. After the mobile station sends the uplink preamble signal, the mobile station processes communication data using each function unit shown in FIG. 4B, and stores the signal in the slot according to FIG. 15 in step 9-7.

After that, the mobile station sends a TDMA signal of the communication data to the base station after a predetermined interval, for example, two slots after sending the uplink preamble signal in step 9-8. Two slots after receiving the uplink preamble signal for example, the base station receives communication data based on the slot number of the uplink preamble signal from the mobile station and demodulates the data in step 9-9.

Figure 10:
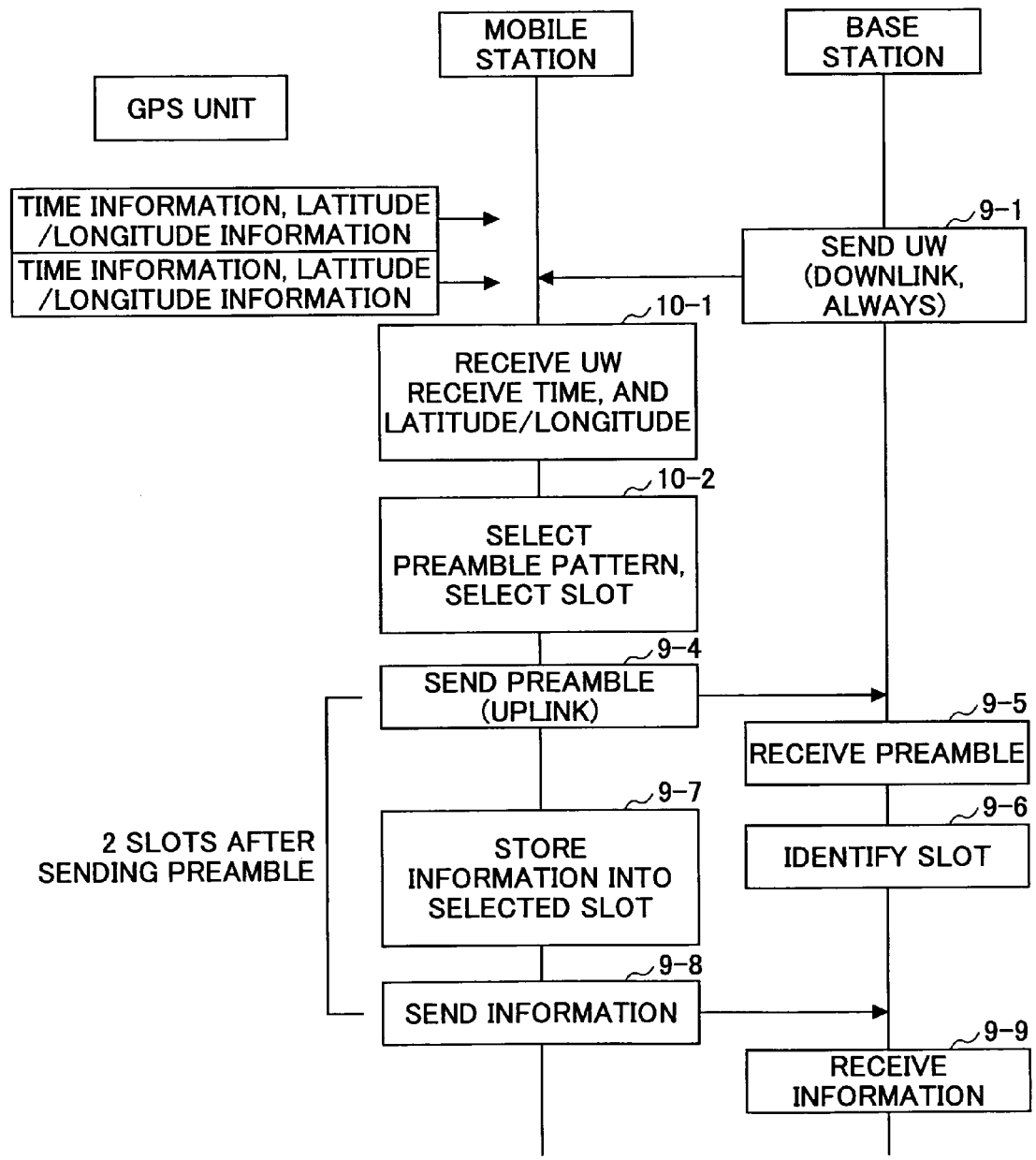
FIG. 10 shows a flowchart of sending operation based on time and latitude/longitude information in the TDMA scheme according to an embodiment.

FIG. 10 shows a flowchart of operation of sending based on a time and latitude/longitude information in the TDMA scheme according to this embodiment. Compared with the flowchart of FIG. 9, in this sending operation, the parameters for determining the slot number of the uplink line includes the latitude/longitude information of the receiving position shown in FIG. 16 in addition to the receive time information of the downlink preamble signal, so that the mobile station identifies the time when receiving the downlink preamble signal and the latitude/longitude information of the receiving position in step 10-1. Then, the mobile station determines the slot of the uplink line based on the identified information so as to select a pattern of the uplink preamble signal in step 10-2. Other steps are similar to corresponding steps of FIG. 9.

The present invention is not limited to the specifically disclosed embodiments, and variations and modifications may be made without departing from the scope of the present invention. For example, since it is possible to use resources efficiently, the present invention can be applied to one-way communication in a wireless LAN (Local Area Network), a wireless MAN (Metropolitan Area Network) and the like in addition to the mobile wireless communication system. In addition, the present invention can be easily applied to a digital broadcasting system in which an image receiving apparatus itself selects resources for transmitting response data when a viewer sends response data.

The present application contains subject matter related to Japanese patent application No. 2006-131177, filed in the JPO on May 10, 2006, the entire contents of which are incorporated herein by reference.

What is claimed is:

1. A communication system, comprising a wireless base station apparatus and a mobile station apparatus, wherein:
   the wireless base station apparatus periodically sends a reference signal to a mobile station apparatus;
   the mobile station apparatus receives the reference signal from the wireless base station apparatus and stores a receive time upon receiving the reference signal and selects wireless uplink resources based on the receive time stored at the mobile station apparatus without sending signals for requesting resource assignment to the wireless base station or receiving signals for reporting resource assignment from the wireless base station, the selected wireless uplink resources being used for sending communication data to the wireless base station apparatus;
   the mobile station apparatus sends communication data to the wireless base station apparatus by using the selected wireless uplink resources; and
   the wireless base station apparatus receives and demodulates the communication data based on the information on the wireless uplink resources sent from the mobile station apparatus.

2. The communication system as claimed in claim 1, wherein the information on the selected wireless uplink resources is information on a burst area in an OFDM or OFDMA scheme.

3. The communication system as claimed in claim 1, wherein the information on the selected wireless uplink resources is information on spreading code in a CDMA scheme.

4. The communication system as claimed in claim 1, wherein the information on the selected wireless uplink resources is information on a time slot in a TDMA scheme.

5. The communication system as claimed in claim 1, wherein the mobile station apparatus sends information on the wireless uplink resources selected by the mobile station apparatus on the basis of the stored receive time to the wireless base station apparatus before the mobile station apparatus sends communication data to the wireless base station apparatus by using the selected wireless uplink resources.

6. A mobile station apparatus comprising:
 a resource selection unit configured to receive a reference signal that is periodically sent from a wireless base station apparatus, to store a receive time upon first receiving the reference signal and to select wireless uplink resources based on the stored receive time without sending signals for requesting resource assignment to the wireless base station or receiving signals for reporting resource assignment from the wireless base station, the selected wireless uplink resources being used for sending communication data to the wireless base station apparatus; and
 a data send unit configured to send communication data to the wireless base station apparatus by using the selected wireless uplink resources.

7. The mobile station apparatus as claimed in claim 6, wherein the mobile station apparatus communicates signals with the wireless base station apparatus using an OFDM or OFDMA scheme, and wherein the selected wireless uplink resources used for sending the communication data are a burst area in which a plurality of sub-channels having different carrier frequencies are combined.

8. The mobile station apparatus as claimed in claim 6, wherein the mobile station apparatus communicates signals with the wireless base station apparatus using a CDMA scheme, and wherein the selected wireless uplink resources used for sending the communication data are spreading code.

9. The mobile station apparatus as claimed in claim 6, wherein the mobile station apparatus communicates signals with the wireless base station apparatus using a TDMA scheme, and wherein the selected wireless uplink resources used for sending the communication data are a time slot.

10. A wireless base station apparatus, comprising:
 a unit configured to send a reference signal to a mobile station apparatus;
 a unit configured to send to a mobile station apparatus a reference signal that makes the mobile station apparatus perform steps of: receiving the reference signal from the wireless base station and storing a receive time of the reference signal and selecting wireless uplink resources on the basis of the receive time stored at the mobile station apparatus without sending signals for requesting resource assignment to the wireless base station or receiving signals for reporting resource assignment from the wireless base station; and
 a unit configured to receive and demodulate, the communication data sent from the mobile station apparatus by using the selected wireless uplink resources selected by the mobile station apparatus on the basis of the receive time stored at the mobile station apparatus.

11. The wireless base station apparatus as claimed in claim 10, comprising;
 a unit configured to communicate signals with the mobile station apparatus using an OFDM or OFDMA scheme, and to receive, from the mobile station apparatus as the information on the selected wireless uplink resources, information on a burst area in which a plurality of sub-channels having different carrier frequencies are combined; and
 a unit configured to receive and demodulate the communication data sent by the burst area.

12. The wireless base station apparatus as claimed in claim 10, comprising;
 a unit configured to communicate signals with the mobile station apparatus using a CDMA scheme, and to receive, from the mobile station apparatus as the information on the selected wireless uplink resources, information on spreading code; and
 a unit configured to receive and demodulate the communication data spread by the spreading code.

13. The wireless base station apparatus as claimed in claim 10, comprising;
 a unit configured to communicate signals with the mobile station apparatus using a TDMA scheme, and to receive, from the mobile station apparatus as the information on the selected wireless uplink resources, information on a time slot; and
 a unit configured to receive and demodulate the communication data sent by the time slot.

* * * * *